United States Patent
Schmale et al.

(10) Patent No.: US 7,136,105 B2
(45) Date of Patent: Nov. 14, 2006

(54) CAMERA SYSTEM INCLUDING A SAFETY CIRCUIT

(75) Inventors: Peter C. Schmale, Veldhoven (NL); Marinus C. W. Van Buul, Oostiend (NL)

(73) Assignee: Thomson Licensing, Boulogne-Billancourt (FR)

( * ) Notice: Subject to any disclaimer, the term of this patent is extended or adjusted under 35 U.S.C. 154(b) by 745 days.

(21) Appl. No.: 10/332,308

(22) PCT Filed: Jul. 6, 2001

(86) PCT No.: PCT/EP01/07752

§ 371 (c)(1),
(2), (4) Date: Jan. 6, 2003

(87) PCT Pub. No.: WO02/03686

PCT Pub. Date: Jan. 10, 2002

(65) Prior Publication Data

US 2003/0142230 A1  Jul. 31, 2003

(30) Foreign Application Priority Data

Jul. 6, 2000  (EP) .................................. 00202360

(51) Int. Cl.
*H04N 5/225*  (2006.01)

(52) U.S. Cl. ..................................................... 348/372

(58) Field of Classification Search ................ 348/372; 396/279, 303; 361/49; 320/112, 114
See application file for complete search history.

(56) References Cited

U.S. PATENT DOCUMENTS

| 4,335,412 | A |   | 6/1982  | Aschwanden ................ 361/50 |
| 4,523,248 | A | * | 6/1985  | Schmale et al. .............. 361/1 |
| 4,782,393 | A |   | 11/1988 | Kawamura ................... 358/209 |
| 5,151,841 | A | * | 9/1992  | Knights ....................... 361/86 |
| 6,018,229 | A | * | 1/2000  | Mitchell et al. ............. 320/112 |
| 6,104,167 | A | * | 8/2000  | Bertness et al. ............. 320/132 |
| 6,114,833 | A | * | 9/2000  | Langston et al. ........... 320/109 |

FOREIGN PATENT DOCUMENTS

GB  2 223 368  4/1999

* cited by examiner

*Primary Examiner*—Ngoc-Yen Vu
*Assistant Examiner*—Nicholas G Giles
(74) *Attorney, Agent, or Firm*—Joseph J. Laks; Robert B. Levy; Jorge Tony Villabon

(57) ABSTRACT

Camera systems are often built up from a base station, a detachable cable, and a camera. A dangerous situation may arise the moment the cable is detached from the camera because there is (still) a voltage present on the cable. The invention provides a camera system in which this problem is solved by means of a safety circuit capable of detecting from the base station whether a camera is connected to the cable or not.

6 Claims, 1 Drawing Sheet

CAMERA SYSTEM INCLUDING A SAFETY CIRCUIT

CAMERA SYSTEM INCLUDING A SAFETY CIRCUIT

This application claims the benefit under 35 U.S.C. § 365 of International Application PCT/EP01/07752 filed Jul. 6, 2001, which claims the benefit of European Application No. 00202360.4, filed Jul. 6, 2000.

The invention relates to a camera system including a safety circuit. More particularly, the invention relates to professional camera linked to a base station by means of a cable.

BACKGROUND OF THE INVENTION

U.S. Pat. No. 4,523,248 discloses a professional camera system comprising a TV studio camera connected to an accompanying base station by means of a cable (usually a triaxial cable, commonly known as triax) wherein at least two conductors are used for AC power supply. A safety circuit is serially connected between an AC supply and a conductor of the supply cable. The disclosed safety circuit cannot works with a DC supply.

With the introduction of portable triax cameras, the principle was extended with the possibility of supplying such a portable camera with a DC voltage, with the result that the supply in the portable camera itself becomes substantially simpler, more compact, and lighter than with the use of an AC supply with the accompanying transformer or coil which is necessary for protection. According to the safety standard IEC65 valid at the time, a DC voltage of 100 VDC was regarded as safe, and the supply voltage was chosen such that this value was not exceeded. As a result, no safeguard against touching is necessary at this supply voltage when the connection cable is detached.

The standard EN60065 valid at this moment will be changed on Jan. 05, 2001, such that the safe voltage of at most 100 VDC is reduced to at most 60 VDC. This voltage of 60 VDC is too low for transmitting the required power, so that problems will occasionally arise during detaching of the cable.

SUMMARY OF THE INVENTION

The invention provides a camera system including a safety circuit which comply with the requirements mentioned above. The safety circuit includes a current injector and a current detector connected in parallel to the cable in such a way they are transparent for DC supply.

The invention is a camera system comprising a base station and a camera coupled to the base station by means of a detachable cable, the cable comprising at least two conductors. The base station comprises power supply means for providing power supply to the two conductors, a controlled switch for coupling or not power supply means with the conductors, a current injector connected in parallel to the two conductors, the current injector providing an AC current at a predetermined frequency, and a current detector connected in parallel to the two conductors, the current detector measuring the AC current at the predetermined frequency. The camera comprises means (C) for shortening the AC current at the predetermined frequency.

The invention is specifically provided for a DC supply but it can also be used with an AC supply.

According to preferred embodiments, the base station comprises at least an impedance between the power supply means and the connection nodes of current injector and detector, said impedance being low ohmic for DC current and high-ohmic for AC current of the predetermined frequency. The impedance can be replaced by an impedance circuit being low-ohmic when a significant DC current flows into it, or being high-ohmic when the DC current is not significant.

BRIEF DESCRIPTION OF THE DRAWINGS

These and other objects of the invention will be explained in more detail with reference to the examples, to which the invention is not limited. In the drawing.

DETAILED DESCRIPTION

Figure 1:
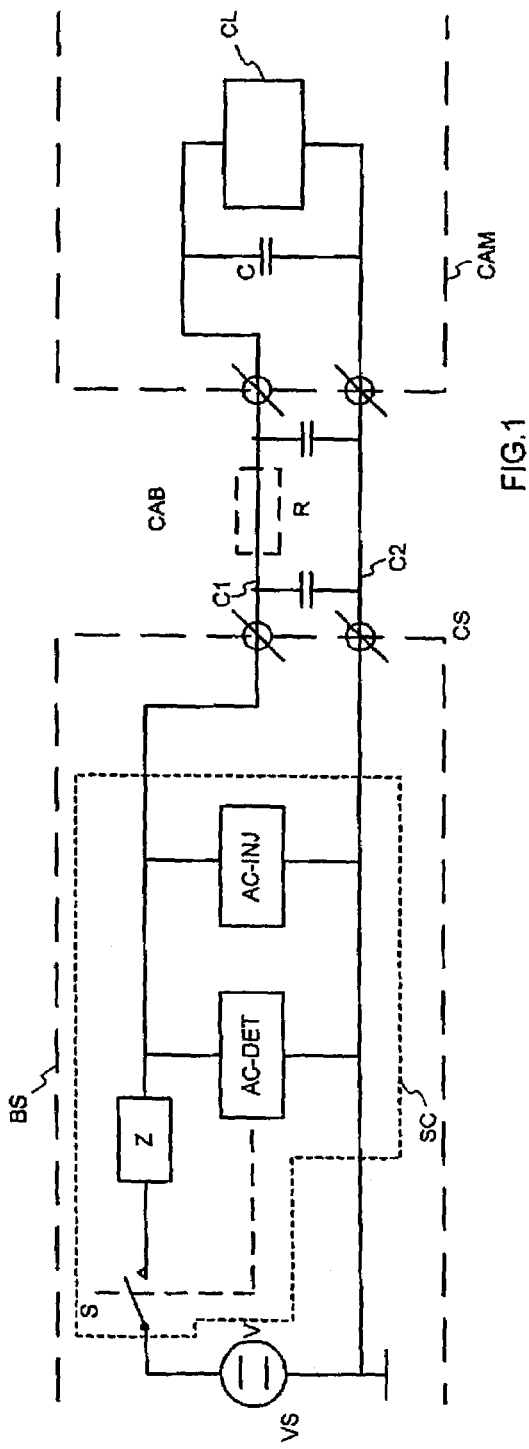
FIG. 1 is a block diagram of an example of a camera system according to the invention.

FIG. 1 is a block diagram of an example of a camera system CS with a base station BS, a detachable cable CAB, and a portable camera CAM which has a capacitance C in parallel to the load of the portable camera (an input capacitor is always necessary anyway for a switch-mode DC-DC converter).

An AC test current is injected into the supply voltage of the cable CAB via an AC injector AC-INJ, and an impedance Z is included in series with the supply source VS, which impedance is low-ohmic for DC, but which is high-ohmic with respect to the cable resistance for the AC frequency chosen.

Both the AC injector AC-INJ and the AC detector AC-DET are coupled in parallel to the cable conductors C1 and C2 inside the base station BS. The AC injector AC-INJ and the AC detector AC-DET can be made as disclosed in U.S. Pat. No. 4,523,248

As long as the cable CAB is connected to the camera CAM, the injected AC current is substantially short-circuited by the input capacitor C of the camera.

The moment the cable is detached, the AC voltage applied thereto rises substantially because the capacitance of the cable (and of any cable filters in the base station) is much smaller than the input capacitance of the camera. This is detected by the AC detector AC-DET, which subsequently opens a switch S so that the supply voltage V is removed from the cable CAB, which is accordingly safe to touch.

When the camera is connected again, the AC voltage is attenuated again owing to the injected AC current, and the AC detector AC-DET will connect the supply voltage V again via the switch S.

The use of a capacitor C is the easiest solution for a DC supply. If the man of the art wants to use the invention with an AC supply, it is preferable to replace the capacitor C by other means which shorten only the current at the frequency of the current provided by the AC injector. Such alternative means can be for example a selective rejection filter tuned on the frequency provided by the AC injector.

The impedance Z is not an essential element of the safety circuit but it can improve the efficiency of the circuit.

The properties of the impedance Z will be chosen for better operation such that it has a low impedance and dissipation when a camera system CS is operated at full load, and yet shows a high impedance when the current drops to substantially zero.

The basic idea accordingly is to increase the AC resistance of the impedance Z at a small load current.

Circuits comprising only a (comparatively large and heavy) passive component and circuits comprising a combination of active and passive components (lighter and smaller) are possible for the impedance Z.

The most suitable passive component is a coil. The coil must have a comparatively high value of at least a few tens of mH on account of the value of the cable and filter capacitance present.

A "conventional" coil for the maximum DC current through the cable (approximately 1.5 A in the present case) would become very bulky and heavy. This is why a coil is used whose AC impedance is sufficiently great only in the case of a very small load current. The dimensions of the coil may be much smaller as a result of this. The winding of the coil is suitable for the maximum DC current which the supply source should be capable of delivering, but the coil has no air gap and a core of a relative permeability which is as high as possible. As a result, the core will become saturated at a low supply current already, and the AC impedance will drop steeply. This, however, is no disadvantage because in this situation the camera CAM is always connected, and the AC test current is accordingly short-circuited by the camera input capacitor C. When the camera is switched off (but not detached), the supply current drops to substantially zero, the coil gets its maximum self-induction again, and the AC detector AC-DET would be capable of detecting the increase in the AC test voltage were it not that the AC test current is still being short-circuited by the camera input capacitor C. The supply voltage V accordingly remains available for the camera as before, and the supply current can rise again as soon as the camera is switched on again. If the camera is completely detached, however, it is not only the input capacitance of the camera which disappears, but the supply current also drops back to substantially zero. This again gives the coil its maximum self-induction; the AC detector can now detect the rise in the AC test voltage an can switch off the supply voltage by means of the switch S.

The switch S, the impedance circuit Z, the AC injector AC-INJ, and the AC detector AC-DET together form the safety circuit SC.

Figure 2:
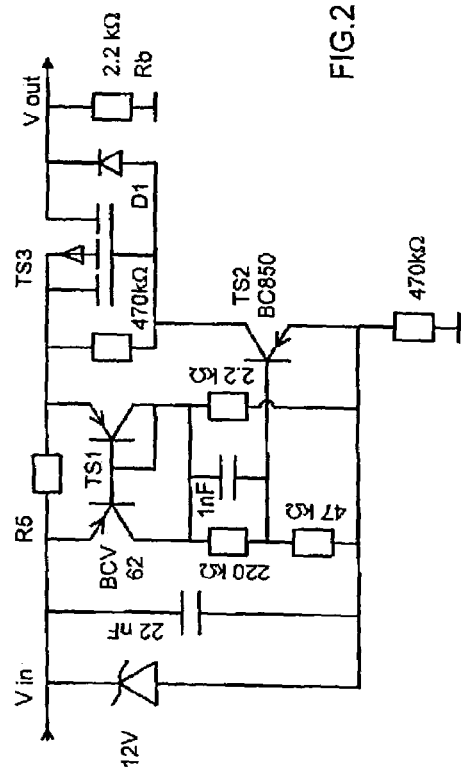
FIG. 2 shows a more detailed example of an impedance circuit in a safety circuit according to the invention.

FIG. 2 shows an embodiment of an impedance circuit Z2 with active components. If a significant DC current flows through the resistor RS, the transistors TS1, TS2 and TS3 are all conducting. The voltage drop across the circuit is a minimum then. When the camera CAM (see FIG. 1) is switched off (but not detached), the voltage across RS is substantially zero, TS1 now conducts so little that TS2 does not conduct at all anymore. This leads to a tendency for TS3 to stop conducting entirely as well, but since the diode D1 starts conducting, the drain of TS3 remains 'stuck' at a voltage of 1 to 4 volts below the source voltage of TS3 (diode voltage+threshold voltage of TS3). TS3 is now so high-ohmic that the AC voltage caused by the injected AC current could be detected in principle, were it not that this current is still short-circuited by the camera input capacitor C (see FIG. 1).

The moment the camera is switched on again, the drain voltage of TS3 will drop, the gate voltage will also drop via D1, TS3 will become more strongly conducting so that the voltage across RS rises, TS1 starts conducting so that also TS2 starts conducting again, and the gate-source voltage rises to the extent that TS3 becomes fully conducting again. If the cable is detached, however, TS3 becomes high-ohmic again, and now the AC detector AC-DET (see FIG. 1) can detect the rise in the AC test voltage and switch off the supply voltage by means of the switch S.

The invention was described above with reference to an example. It will be clear to those skilled in the art that the example may be modified in numerous ways without departing from the scope of the invention.

What is claimed is:

1. A camera system with a base station and a camera coupled to the base station by means of a detachable cable, the cable having at least two conductors, comprising:
    the base station having a power supply means for providing power supply to the two conductors, a controlled switch for coupling or not power supply means with the conductors, a current injector connected in parallel to the two conductors, the current injector providing an AC current at a predetermined frequency, and a current detector connected in parallel to the two conductors, the current detector measuring the AC current at the predetermined frequency,
    the camera having a means for short circuiting the AC current at the predetermined frequency.

2. The system of claim 1, where, in a first condition said base station and said camera are coupled via said cable and said current detector fails to detect said predetermined frequency and enables said power supply to said conductors, and in a second condition said base station and said camera head are not coupled via said cable, said current detector detects said predetermined frequency and disables said power supply to said conductors.

3. The system of claim 1, wherein power supply means provides a DC voltage.

4. The system of claim 3, wherein the base station comprises at least an impedance between the power supply means and the connection nodes of current injector and detector, said impedance being low ohmic for DC current and high-ohmic for AC current of the predetermined frequency.

5. The system of claim 3, wherein the base station comprises at least an impedance circuit between the power supply means and the connection nodes of current injector and detector, said impedance circuit being low-ohmic when a significant DC current flows into it, and being high-ohmic when the DC current is not significant.

6. The system of claim 1, wherein the means for short circuiting the AC current at the predetermined frequency is a capacitor.

* * * * *